| United States Patent [19] | [11] | 4,195,164 |
|---|---|---|
| Meyer et al. | [45] | Mar. 25, 1980 |

[54] TRANSPARENT POLYAMIDES

[75] Inventors: Rolf-Volker Meyer; Rolf Dhein; Friedrich Fahnler, all of Krefeld, Fed. Rep. of Germany

[73] Assignee: Bayer Aktiengesellschaft, Fed. Rep. of Germany

[21] Appl. No.: 925,227

[22] Filed: Jul. 17, 1978

[30] Foreign Application Priority Data

Aug. 18, 1977 [DE] Fed. Rep. of Germany ....... 2737257

[51] Int. Cl.$^2$ ............................................. C08G 69/26
[52] U.S. Cl. .............................. 528/339; 260/33.4 R; 528/338; 528/336; 528/340; 528/346; 528/347; 528/349
[58] Field of Search ................ 528/346, 339, 338, 340

[56] References Cited

U.S. PATENT DOCUMENTS 3,249,591  5/1966  Gadecki et al. ...................... 528/346

Primary Examiner—Harold D. Anderson
Attorney, Agent, or Firm—Connolly and Hutz

[57] ABSTRACT

Transparent copolyamides obtained by polycondensation of mixtures of positional isomeric diaminodicyclohexyl methanes and optionally further diamines and azelaic acid and optionally isophthalic and/or adipic acid. The copolyamides are valuable moulding compounds for the manufacture of various products such as sheets, films, plates, tubes, rods and containers.

6 Claims, No Drawings

TRANSPARENT POLYAMIDES

This invention relates to transparent, thermoplastic copolyamides which have a high dimensional stability under heating.

The invention relates in particular to polyamides which are prepared by the polycondensation of an isomeric mixture of 4,4'-diaminodicyclohexyl methane, 2,4'-diaminodicyclohexyl methane and 2,2'-diaminodicyclohexyl methane and optionally minor quantities of aliphatic and/or other cycloaliphatic diamines as the diamine component with azelaic acid and optionally isophthalic acid and/or adipic acid as dicarboxylic acid components.

For many purposes, the usual polyamides, such as 6-polyamide or 6,6-polyamide, are much preferred to other thermoplastically processible materials on account of their well known advantageous combination of properties. However, the partial crystallinity of these types of polyamides, also has the effect that moulded products produced from these polyamides are invariably opaque so that these polyamides cannot be used for the production of transparent shaped products.

There has therefore been no lack of attempts to produce polyamides which not only have the advantageous properties of polyamide-6 or polyamide-6,6 but are also amorphous and therefore transparent.

One of these attempts is the use of bis-(4-aminocyclohexyl)-methane for the production of polyamides. Transparent polyamides produced from this amine and aromatic dicarboxylic acids such as isophthalic acid (U.S. Pat. No. 2,696,482) or terephthalic acid (U.S. Pat. No. 2,516,585) are already known, but these products are difficult to process thermoplastically on account of their high melt viscosity.

Attempts have also been made to produce transparent polyamides from bis-(4-aminocyclohexyl)-methane and other polyamide-forming components such as adipic acid, hexamethylene diamine and ε-caprolactam. But these polyamides have very little resistance to solvents and become cloudy due to the formation of spheroliths.

The polyamides described in German Offenlegungsschrift No. 1,595,354 (=GB-PS-1,193,487) which are based on bis-(4-aminocyclohexyl)-propane and adipic acid, have less tendency to crystallize but thermoplastic processing of these polyamides is very difficult on account of their high softening points.

Lower melting polyamides obtained from bis-(4-aminocyclohexyl)-methane and aliphatic dicarboxylic acids such as adipic acid (U.S. Pat. No. 2,585,163) are either opaque or tend to become cloudy due to subsequent crystallization.

In German Offenlegungsschrift No. 1,933,395 (=U.S. Pat. No. 3,597,400) there are described transparent polyamides which contain bis-(4-aminocyclohexyl)-methane and hexamethylene diamine as the diamine components and isophthalic acid and terephthalic acid as the dicarboxylic acids in strictly defined proportions.

One particular disadvantage of these polyamides is that the proportion of bis-(4-aminocyclohexyl)-methane, which has a very advantageous effect on the polyamide's dimensional stability under heating, should not exceed 50 mol percent, i.e. ca. 65% by weight. Products which contain a higher proportion of bis-(4-aminocyclohexyl)-methane have such a high melt viscosity that they can no longer be shaped by the injection moulding processes commonly used.

The high proportion of hexamethylene diamine which is an essential requirement therefore results in products which have an insufficient dimensional stability under heating.

Copolyamides of bis-(4-aminocyclohexyl)-methane and 3-ethyl-1,10-decane dicarboxylic acid are described in German Offenlegungsschrift No. 2,125,906 (=U.S. Pat. No. 3,808,181). Although the transparent polyamides can be processed easily, they have a insufficient dimensional stability of only 130° C., because of the long and branched carbon chain of the dicarboxylic acid. Moreover, 3-ethyl-1,10-decane dicarboxylic acid, which is the essential component is difficult to obtain.

In the German Offenlegungsschrift No. 2,642,244 there have been disclosed transparent polyamides obtained from bis-(4-aminocyclohexyl)-methanes, isophthalic acid and inter alia salts of aliphatic dicarboxylic acids and aliphatic diamines in which the average number of methylene groups per amide group must be at least 9. These polyamides have insufficient dimensional stability under heating and their transparency is impaired in boiling water, evidently due to the long chain constituents.

The transparent polyamides hitherto proposed thus have disadvantages in their chemical resistance, softening temperature and processiblity in the molten state.

Moreover, the diaminodicyclohexyl methane used in the prior art processes is always only pure 4,4'-isomer in which only the proportion of the various stereo isomers (trans, trans; trans, cis; cis, cis) may vary. Mixtures of positional isomeric diaminodicyclohexyl methanes such as 4,4'- and 2,4'-diaminodicyclohexyl methanes and/or 2,2'-diaminodicyclohexyl methanes are not used.

This is all the more remarkable in view of the fact that in order to obtain 4,4'-diaminodicyclohexyl methanes from commercial diaminodiphenyl methanes it is necessary to carry out an additional fractional distillation before hydrogenation or to employ a special method of preparation for 4,4'-diaminodiphenyl methanes.

It has now surprisingly been found that transparent copolyamides which do not have the disadvantages mentioned above can also be prepared from a mixture of positional isomeric diaminodicyclohexyl methanes such as those obtained, for example, from the hydrogenation of commercial diaminodiphenyl methane, and optionally minor quantities of an aliphatic and/or another cycloaliphatic diamine as diamine components and a mixture of azelaic acid and optionally isophthalic acid and/or adipic acid.

The polyamides can be processed without difficulty into transparent shaped articles which are tough and have a high dimensional stability under heating and a high resistance to organic solvents.

The present invention therefore relates to transparent, thermoplastic copolyamides which have a relative viscosity of at least 2.2, (determined using a 1% solution of the polyamide in m-cresol at 25° C.) obtained by the polycondensation of (1) 70–100 mol percent, preferably 80–100 mol percent of a mixture of positional isomeric diaminodicyclohexyl methanes composed of
 (a) 70–99 mol percent, preferably 75–95 mol percent of 4,4'-diamino isomers,
 (b) 1–30 mol percent, preferably 3–20 mol percent of 2,4'-diamino isomers and (c) 0–2 mol percent, preferably 0–1 mol percent of 2,2'-diamino isomers;

(2) 0–30 mol percent, preferably 0–20 mol percent, of a $C_6$–$C_{12}$ acyclic aliphatic diamine and/or of a $C_8$–$C_{15}$ cycloaliphatic diamine different from the diaminodicyclohexyl methanes mentioned under (1), such that the molar ratio of all the cycloaliphatic diamines from (1) and (2) to the acyclic aliphatic diamines is at least 4:1, preferably 5:1, and the sum of (a)–(c) and of (1) and (2), respectively, is always 100 mol percent, and (3) equivalent quantities of dicarboxylic acids consisting of (d) 50–100 mol percent, preferably 70–80 mol percent of azelaic acid and (e) 50–0 mol percent, preferably 30–15 mol percent of isophthalic acid and/or adipic acid, with the provision that either the dicarboxylic acid component being composed of at least 2 dicarboxylic acids or the diamine component being composed of the isomeric mixture mentioned under (1) and at least one diamine mentioned under (2) and the sum of (d)+(e) is always 100 mol %.

Copolyamides which contain a mixture of positional isomeric diaminodicyclohexyl methanes as the only diamine component are preferred.

The acyclic aliphatic diamines used are preferably hexamethylene diamine or trimethyl hexamethylene diamine.

The positional isomers of the diaminodicyclohexyl methane mixture (a)–(c) consist of trans, trans-, cis, trans- and a minor proportion of cis, cis-isomers.

The condensation reaction is preferably carried out with a mixture of diaminodiphenyl methane isomers which has been obtained by the condensation of aniline with formaldehyde and which is subsequently hydrogenated. The isomeric mixture should have preferably a melting point of 30° C. but if it contains less than 90% of 4,4'-isomers it may be liquid at room temperature.

Apart from the acyclic aliphatic diamines, which may be used in quantities of from 0–20 mol percent, preferably 0–10 mol percent for the polycondensation from diaminodicyclohexyl methanes different cycloaliphatic diamines containing 8–15 carbon atoms may also be incorporated. Examples of such cycloaliphatic diamines include 1,3- and 1,4-bis-aminomethyl-cyclohexane, isophorone diamine, 2,5-bis-aminomethyl-tricyclo(2,2,1)heptane and 4,4'-diaminodicyclohexyl propane.

Isophthalic acid which may be used for the condensation reaction may contain up to 10% of terephthalic acid, for example, due to its method of preparation.

The copolyamides may be prepared by the conventional methods used for producing polyamides from diamines and dicarboxylic acids. The mixture of starting components may be heated to temperatures of from 190° to 230° C. and a preliminary condensation reaction may be carried out at this temperature range. After termination of the preliminary condensation reaction, polycondensation is completed at temperatures of from 240° to 300° C.

The condensation reaction may be carried out under vacuum towards the end of polymerisation, but this is by no means essential.

The pre-condensation may be carried out with or without the addition of water and at atmospheric pressure or in sealed autoclaves under the vapour pressure of the water.

Precondensation is preferably carried out in sealed autoclaves in the presence of from 10 to 20% by weight of water. It is not necessary to start with the salts of the monomers when carrying out polycondensation reaction, especially if precondensation is carried out in the presence of water.

The loss of diamine which occurs during polycondensation is preferably compensated by using a suitable excess of diamine.

The molecular weight of the polyamides may be regulated by the addition of monocarboxylic acids or amines in known manner.

The relative viscosity of the copolyamides according to the present invention should be at least 2.2 and preferably from 2.4 to 3.5, determined using a 1% solution of the polyamide in m-cresol at 25° C. in an Ubbelohde-Viscometer.

Various additives normally used for polyamides may also be added to the polyamides according to the present invention, e.g. flame retardants, heat and UV stabilizers, anti-oxidants and pigments. These substances may be added at any desired stage before or after polymerisation as in the known amounts. Polyamides according to the present invention which have been reinforced with from 10 to 50% by weight of glass fibres are also high quality products.

The polyamides according to the present invention have excellent transparency, chemical resistance, heat resistance and mouldability in the molten state and they are valuable moulding compounds for the manufacture of various moulded and pressed products such as sheets, films, plates, tubes, rods and containers of various types.

EXAMPLE 1

3.76 kg (20 mol) of azelaic acid, 0.83 kg (5 mol) of isophthalic acid, 5.25 kg (25 mol) of hydrogenated diaminodiphenyl methane (I) and 2 liters of water are introduced onto an autoclave. 40 g of benzoic acid are added to stabilize the molecular weight and 50 g of hydrogenated diaminodiphenyl methane (I) are added to compensate for the diamine losses which occur during the polycondensation reaction.

The reaction mixture is heated to ca. 200° C. under a nitrogen atmosphere. The stirrer mechanism is switched on at 100° C. and the reaction mixture is kept under its own pressure for 4 hours. The pressure is then slowly released, the temperature raised to 270° C., and polycondensation is continued for a further 7 hours at 270° C.

The almost colourless polyamide obtained ($\eta_{rel}$ 2.7) is spun into a water bath, granulated and dried.

Standard test rods are found to have a Vicat dimensional stability under heating (method B) according to DIN (Deutsche Industrienorm) 53 460 of 156° C., a notched impact strength according to DIN 53 453 of 6.3 kJ(kilojoule)/m$^2$ and a flexural strength of 114 MPa (Mega-Pascal) (DIN 53 452). When tested for impact strength (DIN 53 453), 10 samples did not break.

EXAMPLES 2–7

The experiments were carried out by the method described in Example 1 using quantities of the same order.

The composition of the monomers used as the starting materials and various properties of the polyamides obtained are summarized in Table 1, in which the quantities of the starting materials are given in mol percent.

| Example Number | Composition of the starting monomers (Mol-%) | | | | Properties of the polyamides | | | |
|---|---|---|---|---|---|---|---|---|
| | Azelaic Acid | Isophthalic Acid | Adipic Acid | Diamine* | $\eta$ rel | Dimensional stability (Vicat) °C. | Impact Strength | Notched impact strength (kJ/m$^2$) |
| 1 | 80 | 20 | — | 100 | 2.7 | 156 | n.b. | 6.3 |
| 2 | 70 | 30 | — | 100 | 2.6 | 172 | n.b. | 4.8 |
| 3 | 70 | 15 | 15 | 100 | 2.8 | 150 | n.b. | 4.8 |
| 4 | 90 | — | 10 | 100 | 3.1 | 161 | 95 kJ/m$^2$ | 5.2 |
| 5 | 80 | — | 20 | 100 | 3.0 | 155 | n.b. | 4.7 |
| 6 | 70 | — | 30 | 100 | 3.2 | 150 | n.b. | 4.5 |
| 7 | 50 | 25 | 25 | 100 | 2.5 | 177 | n.b. | 3.8 |

*hydrogenated diaminodiphenyl methane (I) : consisting of
94.7 mol % 4,4'diaminodicyclohexyl methane
5.1 mol % 2,4'-diaminodicyclohexyl methane
0.2 mol % 2,2'-diaminodicyclohexyl methane
n.b. = not broken

EXAMPLE 8

A polyamide was prepared from 3.76 kg (20 mol) of azelaic acid, 0.73 kg (5 mol) of adipic acid, 4.72 kg (22.5 mol) of hydrogenated diaminodiphenyl methane (I) and 0.29 kg (2.5 mol) of hexamethylene diamine by the method described in Example 1.

The polyamide obtained, which had a slight yellow tinge, had a relative viscosity of 2.9, a dimensional stability of 141° C. under heating, an impact strength of 90.5 kJ/m$^2$ (9 samples not broken) and a notched impact strength of 4.8 kJ/m$^2$.

EXAMPLE 9

A polyamide is prepared by the method described in Example 1 from 4.70 kg (25 mol) of azelaic acid, 4.20 kg (20 mol) of hydrogenated diaminodiphenylmethane (I) and 0.85 kg (5 mol) of isphorone diamine.

The polyamide, which had a slight yellow tinge, had a relative viscosity of 2.7 and a dimensional stability of 145° C. under heating.

EXAMPLE 10

Example 1 is repeated, except that the diamine component used is hydrogenated diaminodiphenyl methane (II) composed of 88.5 mol% of 4,4'-; 11.0 mol % of 2,4'- and 0.5 mol % of 2,2'-diaminodicyclohexyl methane.

The almost colourless, transparent polyamide obtained has a relative viscosity of 2.6, a dimensional stability under heating according to Vicat of 151° C., a flexural strength of 116 MPa and a notched impact strength of 6.3 kJ/m$^2$. In the test for impact strength, 10 samples did not break.

EXAMPLE 11

Example 1 is repeated, except that the diamine component used is hydrogenated diaminodiphenyl methane (III) with is composed of 79.5 mol% of 4,4'-; 19.5 mol % of 2,4'. and 1.0 mol% of 2,2'-diaminodicyclohexyl methane.

The almost colourless transparent polyamide obtained has the following characteristics: $\eta$rel of 2.5; a dimensional stability of 145° C. under heating (according to Vicat); and a notched impact strength of 5.8 kJ/m$^2$. In the test for impact strength, 10 samples did not break.

Comparison Experiments A-F

These experiments were carried out on a 100 g scale.

The monomers used as the starting materials were used in definite proportions (see Table 2 for molar ratios) and the reaction mixture was slowly heated to 200° C. in an autoclave under a nitrogen atmosphere under stirring. The temperature was then gradually raised to 270° C. by heating, and polycondensation was continued for a further 6 hours at 270° C.

As can be seen from the remarks on the experimental results given in Table 2, the polycondensation reaction could not be carried to completion in some cases owing to the excessively high solidification points of low molecular weight constituents.

Table 2

| Comparison Experiment | Composition of the starting monomers (mol-%) | | | | | |
|---|---|---|---|---|---|---|
| | Azelaic acid | Isophalic Acid | adipic acid | diamine* | $\eta$rel | Remarks on end product |
| A | 30 | 70 | — | 100 (I) | 2.0 | brittle, MV too high |
| B | 30 | 35 | 35 | 100 (I) | 2.6 | little transparency, MV too high |
| C | 60 | — | 40 | 70 (I)30H | 3.3 | Vicat = 105° C. |
| D | 100 | — | — | 80 (I)20H | 2.2 | Vicat = 120° C., not transparent |
| E | 80 | 20 | — | 100(IV) | 1.6 | brittle |
| F | 80 | 20 | — | 70(IV)30H | 1.9 | brittle |

*(I) = hydrogenated diaminodiphenyl methane (I) composition set forth above
(IV) = hydrogenated diaminodiphenyl methane (IV): consisting of
60 mol % 4,4'-diaminodicyclohexyl methane
34 mol % 2,4'-diaminodicyclohexyl methane
6 mol % 2,2'-diaminodicyclohexyl methane
H = hexamethylene diamine
M.V. = melt viscosity

We claim:
1. A transparent thermoplastic copolyamide obtained by polycondensing
(1) 70-100 mol % of a mixture of positional isomeric diaminodicyclohexyl methanes composed of
(a) 75-95 mol % of 4,4'-diamino isomers,

(b) 3–20 mol % of 2,4′diamino isomers and
(c) 0–1 mol % of 2,2′-diamino isomers;
(2) 0–30 mol % of at least one member selected from the group consisting of $C_6$–$C_{12}$ acyclic aliphatic diamines and $C_8$–$C_{15}$ cycloaliphatic diamines other than the diaminodicyclohexyl methanes of (1), the molar ratio of all of the cycloaliphatic diamines of (1) and (2) to the acyclic aliphatic diamine of (2) being at least 4:1 and the sum of (a)–(c) and of (1)–(2), respectively, being 100 mol %, and
(3) an equivalent quantity of dicarboxylic acid consisting of
(d) 50–100 mol % of azelaic acid and
(e) 50–0 mol % of at least one member selected from the group consisting of isophthalic acid and adipic acid with the proviso that either the dicarboxylic acid component consists of at least two dicarboxylic acids or the diamine component consists of the isomeric mixture of (1) and at least one diamine of (2), the sum of (d)+(e) being 100 mol %.

2. A copolyamide as claimed in claim 1 wherein the molar ratio of all of the cycloaliphatic diamines of (1) and (2) to the acyclic aliphatic diamines of (2) is at least 5:1.

3. A copolyamide as claimed in claim 1 wherein (1) is 80–100 mol % of a mixture of positional isomeric diaminodicyclohexyl methanes and (2) is 0–20 mol % of at least one member selected from the group consisting of $C_6$–$C_{12}$ acyclic aliphatic diamines and $C_8$–$C_{15}$ cycloaliphatic diamines.

4. A copolyamide as claimed in claim 1 wherein (d) is 70–85 mol % of azelaic acid and (e) is 30–15 mol % of at least one member selected from the group consisting of isophthalic acid and adipic acid.

5. A copolyamide as claimed in claim 1 wherein the acyclic aliphatic diamine is hexamethylene diamine or trimethyl hexamethylene diamine.

6. A moulded or pressed article prepared from a copolyamide as claimed in claim 1.

* * * * *